March 18, 1930. F. T. ELLIOTT 1,750,996
SHOCK ABSORBER
Filed June 21, 1928
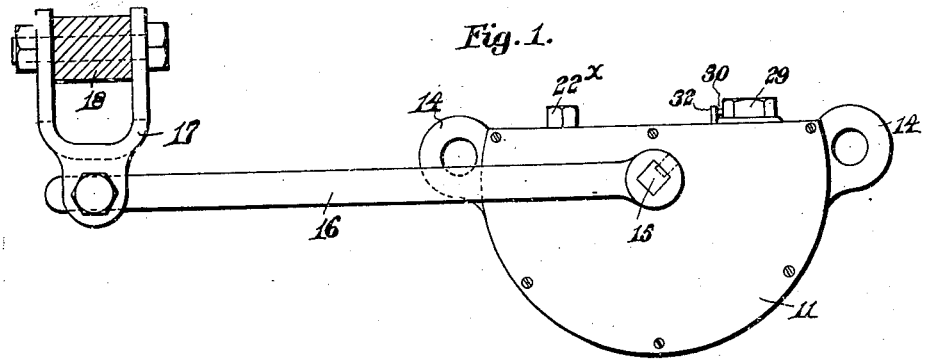
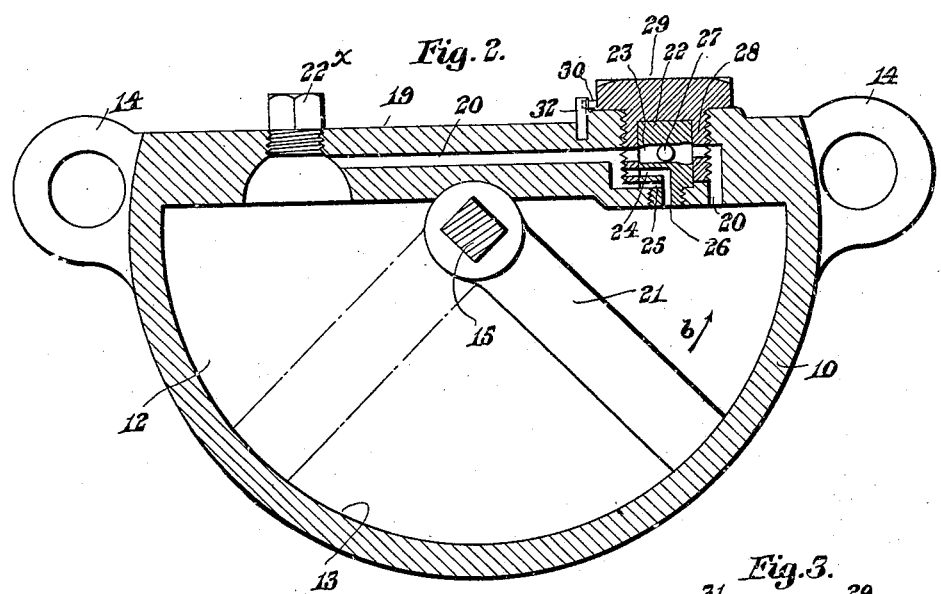
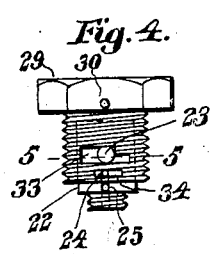
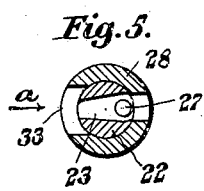
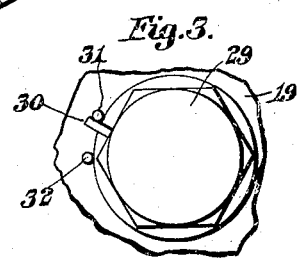
Inventor:
Frederick T. Elliott,
by Walter E. Lombard.
Atty.

Patented Mar. 18, 1930

1,750,996

UNITED STATES PATENT OFFICE

FREDERICK T. ELLIOTT, OF SOMERVILLE, MASSACHUSETTS

SHOCK ABSORBER

Application filed June 21, 1928. Serial No. 287,121.

This invention relates to shock absorbers for motor cars and has for its object the production of a simple, inexpensive and efficient device of this character which will be double acting and in which the entire operation thereof may be controlled by a single valve.

This object is attained by the mechanism illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings:

Figure 1 represents an elevation of a shock absorber embodying the principles of the present invention and showing its connection to the axle of a motor vehicle.

Figure 2 represents an enlarged vertical section of said shock absorber.

Figure 3 represents a plan of a portion of the same showing the head of the controlling valve and the means for limiting the movement thereof about its axis.

Figure 4 represents an elevation of the controlling valve, and

Figure 5 represents a horizontal section of the same on line 5, 5, on Fig. 4.

Similar characters indicate like parts throughout the several figures of the drawing.

In the drawings, 10 is a casing which may be made in any well known manner with a cover 11 secured thereto.

Within the casing 10 is a chamber 12 having a semi-cylindrical inner wall 13.

This casing 10 is adapted to be secured to the body of an automobile by means of bolts extending through the ears 14.

Extending through the casing 10 is a shaft 15 adapted to be oscillated in bearings formed in the end walls of said casing.

To the outer end of the shaft 15 is secured an arm 16, the outer end of which is connected by means of the link 17 to the axle 18 of the automobile.

This connection between the shaft 15 and the axle 18 may be of any usual construction.

The upper wall 19 of the casing 10 has a channel 20 extending therethrough, which channel communicates at its opposite ends with the chamber 12 on opposite sides of the oscillating shaft 15.

This shaft 15 has secured thereto a separating blade 21 which oscillates with the shaft 15 with its outer end always in contact with the inner cylindrical wall 13 of the chamber 12, thus forming a divisional wall in said chamber.

At one end of the channel 20 is a plug 22ˣ which may be removed to permit the chamber 12 to be filled with liquid.

Near the opposite end of the channel 20 is disposed a fixed cylindrical stud 22 having three passages 23, 24, 25 extending therein.

The passage 23 is larger than the passage 24 which in turn is somewhat larger than the passage 25.

These passages 24, 25 both communicate with a vertical duct 26 and the passage 25 is always open so that liquid may flow in either direction therethrough from or into the channel 20.

The passage 23 has a ball 27 disposed therein which ball is movable endwise of said passage, said passage being wider at one end than at its opposite or inlet end.

When the ball is in the position indicated in Fig. 5 the liquid may freely flow through the passage 26 in the direction of arrow $a$, but when the blade 21 is moving in the direction of the arrow $b$ and forcing the liquid in the opposite direction, the ball will move into the narrowest part of the passage 26 and close the same so that all liquid being discharged from the chamber 12 during this movement of the blade 21 will be forced through the vertical duct 26 and the lateral passages 24, 25.

Surrounding the stud 22 is a sleeve 28 having a head 29 above the upper wall 19 of the casing 10 by which said sleeve may be rotated, to some degree, about its axis, the amount of rotation of said sleeve being determined by the lateral pin 30 extending from the head 29 and coming into contact with the pins 31, 32 extending upwardly from the upper wall 19 of the casing.

The sleeve 28 is threaded to the upper wall 19 of the casing 10 as shown in Fig. 2 in order to prevent its being displaced when the blade 21 is moving in the direction of arrow b on said figure.

This sleeve 28 is provided with a port 33 which is deeper at one end than at the other as shown clearly in Fig. 4 of the drawings.

When the sleeve 28 is rotated about its axis contraclockwise the inlet to the passage 23 will be wholly open but when the sleeve 28 is moved clockwise about its axis the narrower portion of the port 33 will be brought into alinement with the inlet to said passage and partially close the same.

The sleeve 28 is also provided with another port 34 which is adapted to close or partially close the passage 24 by rotating the sleeve 28 about its axis.

It will be noted that by rotating the sleeve 28 contraclockwise the ports 33, 34 may be brought into position so that the inlet to the passage 23 will be wholly open and the inlet to passage 24 will be wholly closed.

It is also apparent that when the sleeve 28 is moved about its axis clockwise the ports 33, 34 will be moved into a position in which the inlet to the passage 23 will be half closed and the inlet to the passage 24 wholly open.

It is obvious, therefore, that by means of a single valve mechanism the flow of liquid may be regulated in either direction and a double acting shock absorber is provided taking up the shock when the body of the vehicle is moving downwardly and retarding its movement in the opposite direction.

In this valve mechanism is combined an automatic check valve, an adjusting valve and also a relief valve and this makes it possible to attain a more efficient control of the flow of liquid, vary the pressure of the liquid and secure a finer adjustment of the hydraulic action of the shock absorber relatively to the tension of the automobile springs.

This produces greater working efficiency as the automobile springs compress and recoil.

By means of the valve mechanism the liquid is permitted to flow freely in one direction but when moving in the opposite direction this liquid is retarded by automatically closing the check valve 23, 27 and obliging the liquid to pass through the adjusting valve passage 24 and relief valve passage 25.

When the automobile springs compress the blade 21 will be moved to the left and force the liquid in the chamber 12 under pressure through the channel 20 toward the valve mechanism.

The flow of liquid forces the ball 27 from its seat into the larger part of the passage 23 thus permitting the liquid to flow freely through said passage into the opposite side of the chamber 12, this flow being restricted only by the areas of the ports 33, 34, of the valve mechanism.

The areas of these ports 33, 34, may be varied by moving the sleeve 28 about its axis.

When the automobile springs recoil the arm 16 moves the blade 21 to the right and the liquid forced from the chamber 12, will cause the ball 27 to be moved to its seat and close the passage 23.

Consequently the return flow of the liquid must be through the adjusting valve and relief passages 24, 25 which have a lesser area and therefore greatly restrict the return flow of liquid.

The return flow may be retarded to a greater or lesser extent by turning the sleeve 28 and varying the area of the adjusting valve port 34.

Consequently the various elements may be so adjusted that the body of the car will return to its normal position with no disagreeable effects.

The ports 33, 34, in the sleeve 28 opposite the passages 23, 24 are so formed that they wholly uncover the inlets to these passages 23, 24 or partially close the same while the port 33 is disposed in such a manner relatively to the port 34, that the sleeve 28 may be turned to entirely close the inlet to passage 24 while the inlet to passage 23 is wholly open.

Furthermore, the port 33 is so constructed that by turning the sleeve to the right does not affect the area of opening of passage 23 until the end of the sleeve port 33 reaches it when the sleeve begins to close said inlet to passage 23.

By turning the sleeve 28 to left the inlet to passage 23 is half closed at once as the area of the right hand end of this port 33 is only one half the depth of the left hand end thereof.

When the inlet to passage 23 is half closed in this manner there is a greater resistance to the direct liquid flow while the inlet to passage 24 will remain fully open.

Having thus described my invention, I claim:—

1. The combination of a casing having an inner chamber and a channel communicating at opposite ends therewith; an oscillating shaft extending through said casing; a blade movable therewith with its free end contacting with the inner cylindrical wall of said chamber; a fixed cylindrical stud extending transversely of said channel with three passages therethrough, one of which is always open and through all of which liquid may flow freely in one direction; a ball in another passage to close the inlet thereto when liquid is flowing in a reverse direction; and a rotatable sleeve surrounding said stud having a port therein for partially or wholly closing the third passage.

2. The combination of a casing having an inner chamber and a channel communicating at opposite ends therewith; an oscillating shaft extending through said casing; a blade movable therewith with its free end contacting with the inner cylindrical wall of said chamber; a fixed cylindrical stud extending transversely of said channel with three passages therethrough, one of which is always open and through all of which liquid may flow freely in one direction; a ball in a second passage to close the inlet thereto when liquid is flowing in a reverse direction; and a rotatable sleeve surrounding said stud having two ports therein for partially or wholly closing the second and third passage.

3. The combination of a casing having an inner chamber and a channel communicating at opposite ends therewith; an oscillating shaft extending through said casing; a blade movable therewith with its free end contacting with the inner cylindrical wall of said chamber; a fixed cylindrical stud extending transversely of said channel with three passages therethrough, one of which is always open and through all of which liquid may flow freely in one direction; a ball in a second passage to close the inlet thereto when liquid is flowing in a reverse direction; and a rotatable sleeve surrounding said stud having a port therein for partially or wholly closing the third passage.

4. The combination of a casing having an inner chamber and a channel communicating at opposite ends therewith; an oscillating shaft extending through said casing; a blade movable therewith with its free end contacting with the inner cylindrical wall of said chamber; a fixed cylindrical stud extending transversely of said channel with three passages therethrough, one of which is always open and through all of which liquid may freely flow in one direction; a ball in a second passage to close the inlet thereto when liquid is flowing in a reverse direction; a rotatable sleeve surrounding said stud having two ports therein for partially or wholly closing the second and third passages; and means limiting the rotation of said sleeve.

5. The combination of a casing having an inner chamber and a channel communicating at opposite ends therewith; an oscillating shaft extending through said casing; a blade movable therewith with its free end contacting with the inner cylindrical wall of said chamber; a fixed cylindrical stud extending transversely of said channel with two passages therethrough, one of which is always open and through both of which liquid may flow freely in one direction; a ball in a second passage adapted to close the inlet thereto when liquid is flowing in a reverse direction; and a rotatable sleeve surrounding said stud having a port therein for partially closing the second passage.

6. The combination of a casing having an inner chamber and a channel communicating at opposite ends therewith; an oscillating shaft extending through said casing; a blade movable therewith with its free end contacting with the inner cylindrical wall of said chamber; a fixed cylindrical stud extending transversely of said channel with three passages therethrough, one of which is always open and through all of which liquid may flow freely in one direction; a ball in a second passage to close the inlet thereto when liquid is flowing in a reverse direction; and a rotatable sleeve surrounding said stud having a port therein for partially closing the second passage, said port having at one side a depth equal to the inlet to said second passage and at the other side one half said depth.

Signed by me at 294 Washington St., Boston, Massachusetts, this 19th day of June, 1928.

FREDERICK T. ELLIOTT.